Sept. 12, 1950　　　V. N. HAGLUND ET AL　　　2,521,972
DISK TYPE MOWER
Filed Aug. 9, 1946　　　　　　　　　　　　2 Sheets-Sheet 1
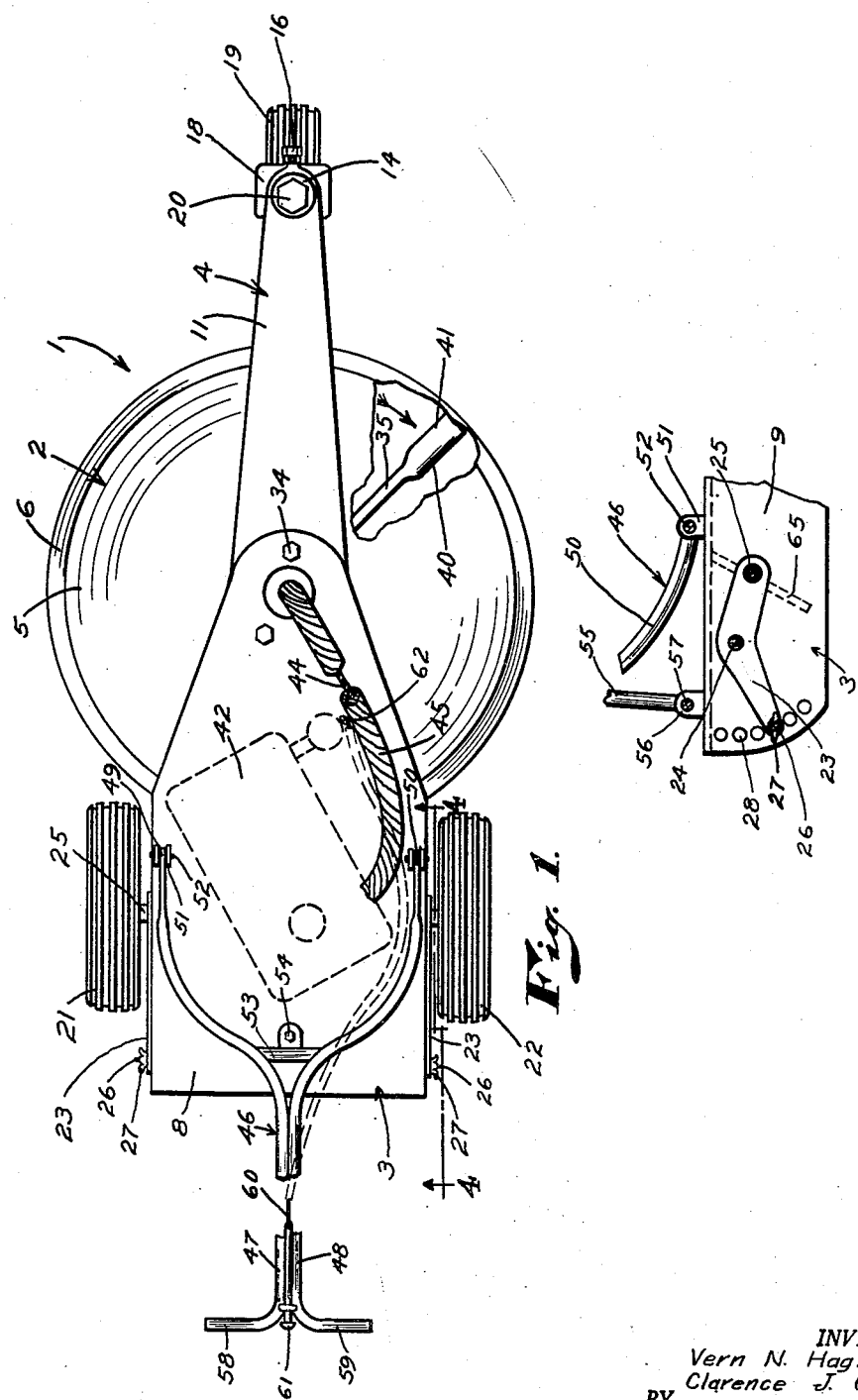
INVENTOR.
Vern N. Haglund
Clarence J. Grenfell
BY
ATTORNEY Sept. 12, 1950 V. N. HAGLUND ET AL 2,521,972
DISK TYPE MOWER
Filed Aug. 9, 1946 2 Sheets-Sheet 2
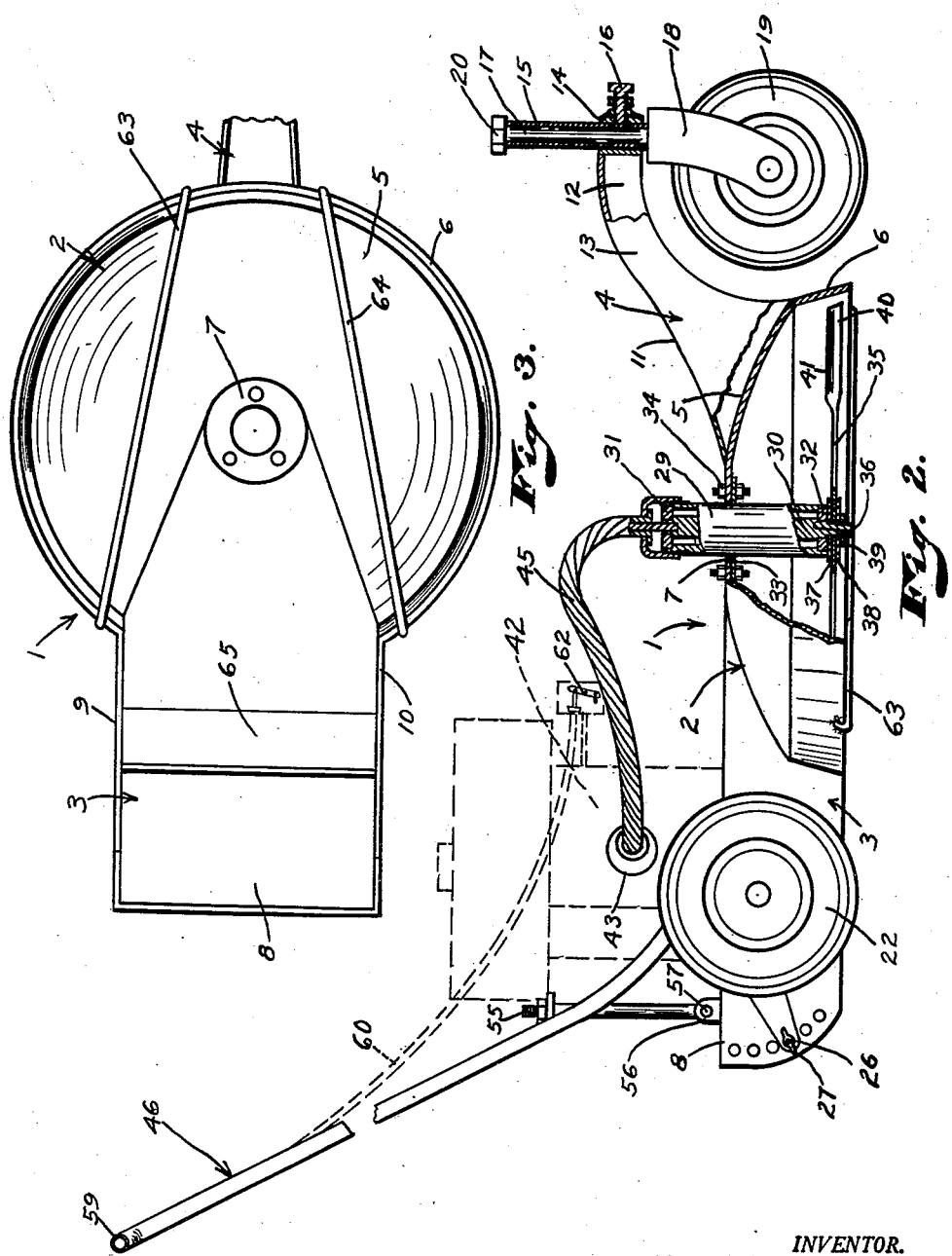
INVENTOR.
Vern N. Haglund
Clarence J. Grenfell
BY
P. N. Lamphere
ATTORNEY

UNITED STATES PATENT OFFICE 2,521,972

DISK TYPE MOWER

Vern N. Haglund, Lakewood, and Clarence J. Grenfell, Denver, Colo., assignors of one-third to Charles F. Meffley, Denver, Colo.

Application August 9, 1946, Serial No. 689,624

5 Claims. (Cl. 56—25.4)

This invention relates to mowers and more particularly to an improved mower of the type employing a cutting blade rotating at a high speed about a vertical axis.

One of the objects of the invention is to produce a mower of the type referred to, which will be power operated, efficient in operation at all times and in cutting all types of grass and weeds, easy to handle and readily adjustable for varying the height of cutting.

Another object of the invention is to produce an improved housing for a mower of the horizontal rotating blade type which will permit the blade to accomplish efficient cutting of grass and other growing matter and the disposal thereof.

A further object is to produce a power mower of the type referred to having improved, conveniently operated, adjusting means for varying the height of cutting of the rotating blade.

Yet a further object is to produce a mower of the kind referred to which will have its housing so designed that the grass to be cut will be held by suction in a vertical position during cutting and when cut is in such a condition that it can be left on a lawn to enhance its growth.

A still further object is to produce a mower of the horizontal rotating blade design that will produce a good cutting job on uneven terrain without "scalping."

Other objects will become apparent from the following description taken in connection with the accompanying drawings in which:

Figure 1 is a top view of a power operated mower embodying the invention;

Figure 2 is a side view of the mower, parts being shown in section;

Figure 3 is a bottom view of the mower housing showing details of construction; and Figure 4 is a side view of the rear wheel adjusting mechanism, said view being taken on the line 4—4 of Figure 1.

Referring to the drawings in detail, which show by way of example a mower embodying the invention, the numeral 1 generally indicates the housing. This housing has three integrally connected portions, namely, a circular main portion 2, a rearwardly extending discharge chute portion 3 and a forwardly extending arm portion 4. The circular portion 2 has a somewhat spherical or dome shaped top 5 and a downwardly extending flared skirt 6, which skirt can be considered as part of a frustum of a cone. The central part of the top is flat, as indicated at 7. The discharge chute portion 3 is provided with a flat top 8 on a level with the flat central part 7 of the main portion, thus providing a continuous surface. The forward end of the discharge chute portion 3 is of general triangular shape. Downwardly extending side walls 9 and 10 are provided on the discharge chute portion including the forward section. The connecting of the discharge chute portion with the main portion is accomplished by providing a general V-shaped space in the main portion and then welding the triangular forward end of the discharge chute portion in this V-shaped space. Both the main circular portion 2 and the chute portion 3 are open at their bottoms and the interior of the circular portion is in full communication with the interior of the discharge or chute portion, all as best seen in the bottom view of Figure 3. The bottom edges of the skirt 6 are preferably in the same plane as the bottom edges of the side walls of the discharge chute portion.

The forwardly extending arm portion 4 is integrally united, as by welding, to the top part 5 of the main circular portion and extends forwardly and upwardly in a curved manner from this top part. The arm has a top section 11 and side walls 12 and 13. The side walls, at their juncture with the top of the main portion, are united to said top from a point substantially near the flat central part 7 to the beginning of the skirt 6. The outer end of the arm has welded therein a support sleeve 14 for slidably receiving a bearing sleeve 15 which is arranged to be adjustable in the support and held in any adjusted position by a set screw 16. In the bearing sleeve 15 is rotatably mounted a spindle 17 which is provided with a fork 18 at its lower end. Journaled between the arms of this fork is a wheel 19 preferably provided with a rubber tire. The wheel, fork and spindle together form what is commonly known as a caster wheel. The spindle 17 is held in the bearing sleeve 15 by a nut 20 at the top thereof. Both the spindle and the bearing sleeve 15 are of greater length than the support sleeve 14 so that the bearing sleeve, together with the spindle, can be adjusted vertically with respect to the support sleeve and arm by manipulating the set screw 16. Thus the height of the front end of the housing with respect to the ground can be conveniently varied.

The discharge chute portion 3 of the housing has journaled thereon two rear wheels 21 and 22, also preferably provided with rubber tires. The width of the discharge chute portion is considerably less than the diameter of the circular portion of the housing and when the rear wheels are mounted at the sides of this portion, as shown, they will be inside of the diametrically opposite side edges of the circular portion of the housing. Both wheels 21 and 22 are mounted in a similar manner and this mounting arrangement is shown in detail in Figure 4. Pivoted to each side wall of the discharge chute portion adjacent the top thereof is a bell-crank lever 23, the pivot comprising a bolt 24 and being positioned substantially at the central part of the lever. The forward arm of the lever has secured thereto a laterally extending spindle 25 on which the wheel is rotatably mounted. The rear arm of the lever is arranged to be clamped to the side wall by means of a bolt 26 having a wing nut 27. To provide for adjustment there are a series of holes 28 in the wall adjacent its rear edge, these holes being arranged on an arc which has its center coinciding with the axis of the pivot bolt 24. Thus by changing the clamped position of the arm by the clamp bolt 26 it is seen that the spindle of the wheel can be raised or lowered with respect to the discharge chute portion of the housing and thereby raise or lower the rear end of the housing as a whole.

With the two rear wheels mounted, as shown, and the forward wheels comprising a caster wheel, the mower can be very easily handled and turned about in any desired manner to cut grass, weeds, etc. in close places. Since the housing is capable of being adjusted with respect to both the rear wheels and the front caster wheels, its height from the ground can be varied at will and the bottom edge of the circular portion and the discharge portion of the housing maintained level with the ground so that an even cut can be made.

In order that the cutting blade may be properly mounted on the circular portion of the housing, there is provided a vertically positioned bearing 29 in which is rotatably mounted a shaft 30 by means of upper and lower bearings 31 and 32. The bearing 29 is arranged to extend above the top of the circular portion of the housing and also into the chamber of the circular housing and to a point close to the plane of the lower edge of the skirt 6. The mounting of the bearing is accomplished by providing the bearing with an annular flange 33 intermediate its ends which is clamped to the under side of flat central part 7 of the circular portion of the housing by means of bolts 34. The cutting blade 35 is of the propeller type in the form of a bar which is removably secured to the lower end of the driving shaft 30, said securing being accomplished by means of a shoulder 36 on the shaft, clamping washers 37 and 38, and a nut 39. The outer ends of the cutting blade are twisted somewhat in opposite directions out of the plane of the blade and both edges thereof are sharpened as indicated at 40 and 41. With this arrangement it is seen that when the blade is rotating in a direction such that the lower sharp edge 40 of each end is the leading edge (indicated by arrow), these edges can perform a cutting operation on grass, weeds, etc. If the edges 40 become dull or damaged, the blade can be reversed and the edges 41 will then be available to do the cutting.

The shaft 30 and the blade attached to its lower end are arranged to be rotated by means of any suitable motor such as, for example, the gasoline engine 42 indicated in outline and mounted on the flat top 8 of the discharge portion of the housing between the two rear wheels. The drive shaft 43 of this engine is connected by means of a flexible drive shaft 44 to the upper end of the driving shaft 30 journaled in the housing and carrying at its lower end the cutting blade. The flexible driving shaft 44 is enclosed within a sheath 45 which is fixed against rotation having one end secured to the engine housing and the other end secured to the top of the bearing 29 in which the shaft 30 is journaled.

The handle 46 for the mower is formed from two tubular members 47 and 48. These tubular members are bent and so welded with each other as to form a Y with the lower legs 49 and 50 secured to the top of the discharge chute portion of the housing at a point slightly forwardly of the axis of the wheels. The connection to the discharge chute portion is accomplished by means of ears 51 welded to the top and bolts 52 extending through the ends of the legs of the tubes and the ears. The legs have extending therebetween a strengthening rod 53 and mounted on this rod is a sleeve 54. This sleeve is adapted to be clamped by nuts to the top of a bolt 55, the lower end of which is pivotally connected by ears 56 and a bolt 57 to the rear end of the top of the discharge chute portion of the housing. With this arrangement the handle is firmly held in a fixed position, yet can be adjusted either up or down by adjusting the nuts on the end of bolt 55. The upper ends of the tubes 47 and 48 are arranged to be bent outwardly in opposite directions to provide hand gripping portions 58 and 59 whereby the person using the mower can conveniently grasp the handle for pushing the mower. In order that control of the gasoline engine may be easily accomplished from the upper end of the handle, a Bowden wire 60 extends from the throttle valve 61 of the engine to a point between the two hand gripping extensions where it is provided with an actuating knob 62.

In order to prevent the cutting blade from "scalping" a lawn when it is moved over uneven terrain, such as terrain having small knolls or depressions, or terrace ridges, the lower side of the circular portion of the housing is provided with two shoes 63 and 64 which extend in a general longitudinal direction. The ends of each of these shoes are suitably connected as, for example, by welding, to the edge of the skirt 6. The shoes 63 and 64 are arranged to be a slightly greater distance apart at their rear ends than at their forward ends as is best shown in Figure 3. The shoes are slightly below the plane of rotation of the blade. These shoes, as arranged, will thus glide on the ground and prevent the blade from engaging the ground if either the front or rear wheels should drop into a depression or a knoll should be passed over by the housing. By having each shoe positioned at a slight angle to the longitudinal axis of the housing, it will be impossible for it to prevent any grass from being exposed to the cutting blade as the mower is being pushed forwardly. Thus clean cutting will not be prevented by the shoes.

The discharge chute portion 3 also carries a baffle plate 65 in its channel which is secured to the side walls of said portion as by welding. This baffle extends from a point adjacent the top of the channel to a point spaced somewhat from the lower edges of the side walls. The plate is angularly arranged so that the lower edge is rearwardly of the top edge. The purpose of this baffle is to cause grass and other material coming through the channel of the discharge chute portion to be deflected downwardly onto the ground and thus not fly out the end of the chute onto the shoes and lower part of the legs of the person pushing the mower. The baffle also not only directs cut grass downwardly onto the ground, but is effective in preventing gravel, pebbles or other particles which may pass through the channel from hitting the operator and causing distress or injury.

From the foregoing description of the mower embodying my invention, it is believed to be apparent that it can be manufactured at a low cost, its construction is light and very sturdy and it is easy to handle and move about in all places to accomplish a good job of cutting. The cutting blade is rotated at a high speed and because of the shape of the ends of the blade, there will be produced a suction action which will pull air into the chamber of the circular portion of the housing and discharge it out through the discharge chute portion. This suction effect is accomplished in an efficient manner by the particular construction of the housing and is very effective in pulling and maintaining grass and other growing matter in an upright position so that the rapidly rotating cutting blade can make a clean cut of the grass or other matter. The form of the housing, and particularly the skirt on the main circular section, insures that there will be a full guard for the rotating blade so that injury to a person will not happen. The dome top is very beneficial in aiding in the proper suction effect, together with the causing of air to flow through the channel formed by the discharge chute which connects with the extreme top of the dome. The flaring skirt also results in efficient cutting as the air flow to the dome portion from beneath the edge of the skirt is directed into the path of the blade. Consequently it will cause grass to be pulled into proper position for cutting by the blade. The arrangement of the wheels on the housing is in such a manner that they do not interfere with close cutting along edges of lawns. The sides of the circular portion of the housing can be moved closely along a wall, for example, and grass growing close to the wall will be sucked into the housing where it will be cut by the rotating blade. The use of the single caster wheel and its method of mounting on the housing by means of the forwardly extending arms insures that no front wheel will act as an obstruction in moving the circular portion of the housing closely into a corner. The height at which it is desired to cut grass or other matter can be readily varied by simple adjusting operations. To move the rear end of the housing up or down, such is accomplished by merely unscrewing a wing nut, removing a bolt and swinging a bell-crank lever to a new position where it is reclamped by the bolt. To adjust the front end so that the lower edge of the skirt is parallel with the ground, all that needs to be done is loosen a set screw, shift the spindle and its bearing relative to the arm and then tighten the set screw. The shoes associated with the skirt of the circular portion insures that there will be no scalping when the mower is moved over uneven ground. The handle of the mower is also easily adjusted so that the user will be comfortable during pushing of the mower. The grass cut by the rotating blade will be very efficiently discharged and this grass or other matter will be cut into very fine particles due to the rapidity of rotation of the blade. Consequently the cut grass will be conditioned so that it can be left on the lawn and enhance its growth without any appreciable unsightliness. Due to the fact that the housing is made out of light material and the handle out of tubing, the mower as a whole will be light in weight and, therefore, movable with a minimum of effort. The particular shape of the housing insures that the light material used will produce a rigid construction. The dome top of the circular portion results in good rigidity, as does also the particular construction of the forwardly extending arm.

Being aware of the possibility of modification in the particular mower construction shown without departing from the fundamental principles of our invention, we do not intend that the scope of the invention be limited in any manner except in accordance with the appended claims.

What is claimed is:

1. In a mower, a housing comprising a circular portion having a dome shaped top wall and a skirt extending downwardly and outwardly from the peripheral edge of the top wall and a discharge chute portion extending rearwardly from the circular portion to a point beyond the periphery thereof and being united therewith, said chute portion having a top extending from the central part of the dome shaped top together with side walls the forward portions of which have edges joined to the dome shaped top and the skirt, both said circular portion and the chute portion being open at the bottom and the channel formed by said chute portion communicating directly in a horizontal direction with the full height of the chamber formed by the circular portion including its dome, a revolving propeller type blade mounted in the circular portion of the housing to rotate in a plane adjacent the lower edge of the skirt and below the dome, said blade having such inclined sections on opposite sides of its axis of rotation that its rotation will cause an air movement upwardly toward the dome top, said dome and skirt being of substantial height so that together there will be a considerable chamber above the revolving blade, means for rotating the blade, and wheels for the housing.

2. In a mower, a housing comprising a circular portion having a dome shaped top wall and a skirt extending downwardly and outwardly from the peripheral edge of the top wall and a discharge chute portion extending rearwardly from the circular portion to a point beyond the periphery thereof and being united therewith, said chute portion having a top portion extending from the central part of the dome shaped top together with side walls the forward portions of which have edges joined to the dome shaped top and the skirt, both said circular portion and the chute portion being open at the bottom and the channel formed by said chute portion communicating directly in a horizontal direction with the full height of the chamber formed by the circular portion including its dome, a baffle plate extending across the channel formed by said chute portion, said baffle plate having its lower edge rearward of its top edge and said lower edge being spaced above the plane of the lower edges of the side walls of the chute portion, a revolving propeller type blade mounted in the circular portion of the housing to rotate in a plane adjacent the lower edge of the skirt and below the dome, said blade having such inclined sections on opposite sides of its axis of rotation that its rotation will cause an air movement upwardly toward the dome top, said dome and skirt being of substantial height so that together there will be a considerable chamber above the revolving blade, means for rotating the blade, and wheels for the housing.

3. In a mower, a housing comprising a circular portion having a dome shaped top wall and a skirt extending downwardly from the peripheral marginal edge of the top wall and a discharge chute portion extending rearwardly from the circular portion to a point beyond the periphery thereof and being united therewith, said chute portion having a top extending from the central part of the dome shaped top together with side walls the forward portion of which have edges joined to the dome shaped top and the skirt, said chute being of a width substantially less than the diameter of the circular portion and the lower free edges of the skirt and the walls being in the same horizontal plane, both said circular portion and the chute portion being open at the bottom and the channel formed by said chute communicating directly in a horizontal direction with the full height of the chamber formed by the circular portion including its dome, a propeller type of blade mounted in the circular portion of the housing to rotate in a plane adjacent the lower edge of the skirt and below the dome, said blade having such inclined sections on opposite sides of its axis of rotation that its rotation will cause an air movement upwardly toward the dome top and said dome and skirt being of substantial height so that together there will be a considerable chamber above the revolving blade, means for rotating the blade, and wheels for the housing.

4. In a mower, a housing comprising a circular portion having a dome shaped top wall and a skirt extending downwardly from the peripheral marginal edge of the top wall and a discharge chute portion extending rearwardly from the circular portion to a point beyond the periphery thereof and being united therewith, said chute portion having a top extending from the central part of the dome shaped top together with side walls the forward portions of which have edges joined to the dome shaped top and the skirt, said chute being of a width substantially less than the diameter of the circular portion and the lower free edges of the skirt and the walls being in the same horizontal plane, both said circular portion and the chute portion being open at the bottom and the channel formed by said chute communicating directly in a horizontal direction with the full height of the chamber formed by the circular portion including its dome, a propeller type of blade mounted in the circular portion of the housing to rotate in a plane adjacent the lower edge of the skirt and below the dome, said blade having such inclined sections on opposite sides of its axis of rotation that its rotation will cause an air movement upwardly toward the dome top, said dome and skirt being of substantial height so that together there will be a considerable chamber above the revolving blade, means for rotating the blade, an arm connected to the circular portion and extending forwardly therefrom a substantial distance, said arm having an inverted U-shaped cross section and being provided at its forward end with a vertically arranged opening and wheels on the housing and forwardly extending arm.

5. In a mower, a housing having a circular portion provided with a dome shaped top and a rearwardly extending chute portion of less width than the diameter of the circular portion, said chute portion having its top wall in the same plane as the top of the dome, a vertical driving shaft mounted in the circular portion, a rotating blade secured to the shaft and rotatable in a horizontal plane within the circular portion adjacent the bottom edge thereof so that the dome establishes a chamber of considerable height above the blade, said blade being of the propeller type with sections thereof on each side of the driving shaft so inclined as to cause air to move upwardly toward the top of the dome as the blade rotates, wheels mounted on opposite sides of the chute portion and lying within lines extending parallel with the longitudinal axis of the housing and passing through diametrical edges of the circular portion, an arm connected with the circular portion and extending forwardly therefrom, a single caster wheel having a vertical pivot shaft mounted in the end of the arm, and means associated with the mounting of each wheel for independently adjusting the height of the housing together with the blade with respect to the ground.

VERN N. HAGLUND.
CLARENCE J. GRENFELL.

REFERENCES CITED

The following references are of record in the file of this patent:

UNITED STATES PATENTS

| Number | Name | Date |
|---|---|---|
| 1,992,494 | Lundin | Feb. 26, 1935 |
| 2,017,524 | Bolens | Oct. 15, 1935 |
| 2,154,564 | Eisenlohr | Apr. 18, 1939 |
| 2,167,222 | Shelor | July 25, 1939 |
| 2,253,452 | Urschel | Aug. 19, 1941 |
| 2,308,076 | Hainke | Jan. 12, 1943 |

FOREIGN PATENTS

| Number | Country | Date |
|---|---|---|
| 514,189 | Great Britain | Nov. 1, 1939 |